United States Patent
Fabris et al.

(10) Patent No.: US 6,425,593 B2
(45) Date of Patent: Jul. 30, 2002

(54) ALUMINUM FRAME HANGER FOR AXLE/SUSPENSION SYSTEMS

(75) Inventors: Eric W. Fabris, Akron; John E. Ramsey, Canton, both of OH (US)

(73) Assignee: The Boler Company., Itasca, IL (US)

( * ) Notice: Subject to any disclaimer, the term of this patent is extended or adjusted under 35 U.S.C. 154(b) by 0 days.

(21) Appl. No.: 09/814,205

(22) Filed: Mar. 21, 2001

Related U.S. Application Data
(60) Provisional application No. 60/191,168, filed on Mar. 22, 2000.

(51) Int. Cl.$^7$ ................................................ B60G 7/00
(52) U.S. Cl. ................. 280/104; 280/86.75; 280/124.1; 280/124.116; 280/124.118
(58) Field of Search .............................. 280/788, 124.1, 280/124.116, 124.128, 86.75, 104

(56) References Cited

U.S. PATENT DOCUMENTS

| | | | | |
|---|---|---|---|---|
| 3,482,854 A | * | 12/1969 | Masser ........................ | 280/788 |
| 4,267,896 A | * | 5/1981 | Hendriksen ................. | 280/788 |
| 4,535,420 A | * | 8/1985 | Ito et al. ..................... | 280/788 |
| RE33,179 E | * | 3/1990 | Pettibone ................... | 280/788 |
| 4,991,686 A | * | 2/1991 | Vandenberg ................ | 280/788 |
| 5,393,096 A | | 2/1995 | Pierce et al. | |
| 5,683,098 A | * | 11/1997 | VanDenberg ............... | 280/788 |
| 5,720,489 A | * | 2/1998 | Pierce et al. ................ | 280/788 |
| 5,775,719 A | * | 7/1998 | Holden ....................... | 280/788 |
| 5,951,032 A | * | 9/1999 | Overby et al. ........ | 280/124.116 |
| 6,123,349 A | * | 9/2000 | Depue ........................ | 280/788 |
| 6,131,930 A | * | 10/2000 | Chalin ........................ | 280/788 |

FOREIGN PATENT DOCUMENTS

| | | | | |
|---|---|---|---|---|
| DE | 004117017 | * | 11/1991 | ................ 280/788 |
| EP | 0 773 119 A1 | | 5/1997 | |
| EP | 0 827 897 A2 | | 3/1998 | |
| JP | 000468243 | * | 1/1992 | ................ 280/788 |
| JP | 09156336 | | 6/1997 | |

* cited by examiner

Primary Examiner—Paul N. Dickson
Assistant Examiner—Toan C To
(74) Attorney, Agent, or Firm—Buckingham, Doolittle & Burroughs, LLP; David P. Dureska, Esq.

(57) ABSTRACT

A frame hanger for suspending an axle/suspension system from an aluminum vehicle frame also is formed of aluminum. The hanger is directly a ached to the other components of the frame by welds. The hanger is an integral structure that successfully reacts loads encountered by the axle/suspension system during operation of the vehicle, and which are transmitted into the other components of the vehicle frame through the hangers. The hanger reacts such loads and especially side or lateral loads, despite being formed from the lightweight metal aluminum, and together with the other components of the vehicle frame is free of add-on support structures such as gussets or the like. The aluminum hanger achieves such efficient load reacting capabilities due to its structural design which substantially completely and continuously surrounds and laterally supports its respective beam bushing assembly of the axle/suspension system suspended from the hanger.

10 Claims, 7 Drawing Sheets

ALUMINUM FRAME HANGER FOR AXLE/SUSPENSION SYSTEMS

This application claims the benefit of provisional application No. 60/191,168, filed Mar. 22, 2000.

BACKGROUND OF THE INVENTION

1. Technical Field

The invention relates to vehicle frames and in particular to frame hangers for mounting axle/suspension systems on the vehicle frame. More particularly, the present invention is directed to a hanger formed of aluminum which efficiently attaches to and forms a part of an aluminum vehicle frame, whereby the overall weight and cost of the frame is reduced as compared to aluminum frames which utilize steel hangers, and further whereby the aluminum hanger efficiently reacts loads emanating from the axle/suspension system during operation of the vehicle.

2. Background Art

A typical leading or trailing arm air-ride axle/suspension system is mounted on and depends from the frame of a vehicle by a pair of rigid frame hangers located adjacent to one of the ends of the axle/suspension system, and by a pair of flexible air springs disposed at the other end of the system. The conventional hanger is a fabricated welded steel boxlike yoke structure that captures the bushing assembly end of a respective one of the pair of suspension arms or beams of the axle/suspension system, using a pivot pin or bolt. The steel hanger in turn is either welded or bolted to another component of the vehicle frame, depending on the material used for the frame. For vehicle frames formed of steel, the steel hanger typically is welded on, whereas for frames formed of aluminum, such as semi-trailer tanker trailers, the hanger must be bolted on because of the impracticality of welding together dissimilar metals.

Although steel hangers satisfactorily mount an axle/suspension system on steel or aluminum vehicle frames and successfully react loads emanating from the system during over-the-road operation of the vehicle, as noted immediately above, the steel hanger must be bolted rather than welded to an aluminum vehicle frame. In order to securely bolt the steel hanger to the aluminum frame, typically a pair of heavy mounting plates are disposed between the hanger and the frame to serve as an interface, which adds unwanted weight and cost to the vehicle. Such complicated bolt mounting also lessens the efficiency of the distribution of loads being transferred from the axle/suspension system, through the hanger, and into the other components of the vehicle frame. Such inefficiency often necessitates the use of add-on flanges, gussets and the like to the hanger and/or vehicle frame. Hangers which are welded directly to the vehicle frame without the use of intervening mounting plates and the like, can be much more efficient in transferring loads into the other components of the vehicle frame.

To avoid such problems associated with mounting steel hangers on otherwise aluminum frames, prior art aluminum hangers have been developed. However, such aluminum hangers have heretofore generally mimicked the design of steel hangers, with a resulting inability of the aluminum hanger to successfully react loads transferred to the hanger from the axle/suspension system, and especially lateral or side loads, without the use of additional flanges, gussets, and the like which add unwanted weight, complexity and cost to the hanger.

The present invention solves the problems of excessive weight and inefficient mounting of a steel hanger to an aluminum vehicle frame, as well as the problems associated with prior art aluminum hangers, through the use of a lightweight yet sturdy aluminum hanger construction which is easily mounted on an aluminum vehicle frame.

SUMMARY OF THE INVENTION

Objectives of the present invention include providing a hanger for aluminum vehicle frames which also is formed of aluminum, but which has a design sturdy enough to react loads emanating from the axle/suspension system, and further which mounts simply and directly to the other frame components for efficient transfer of such loads from the hanger into the other frame components.

These objectives and advantages are obtained by the aluminum frame hanger for axle/suspension systems of the present invention, the general nature of which may be stated as including an aluminum vehicle frame having a frame hanger for suspending a suspension assembly of an axle/suspension from the vehicle frame, the frame including a pair of transversely spaced longitudinally extending main members and a plurality of cross members extending between and interconnecting the main members, the axle/suspension system including a pair of transversely spaced suspension assemblies, each one of the pair of suspension assemblies including a longitudinally extending beam, the beams of the pair of suspension assemblies capturing a transversely extending axle having at least one wheel mounted on each end of the axle, the beams each including at one of its ends a bushing assembly for pivotally mounting the beam on the frame hanger, wherein the improvement comprises an integral frame hanger which substantially surrounds and laterally supports the bushing assembly, so that the hanger reacts lateral loads and other loads transferred from the axle/suspension system into the frame during operation of the vehicle, without requiring additional support structure on the hanger and on the main members and the cross members of the frame.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
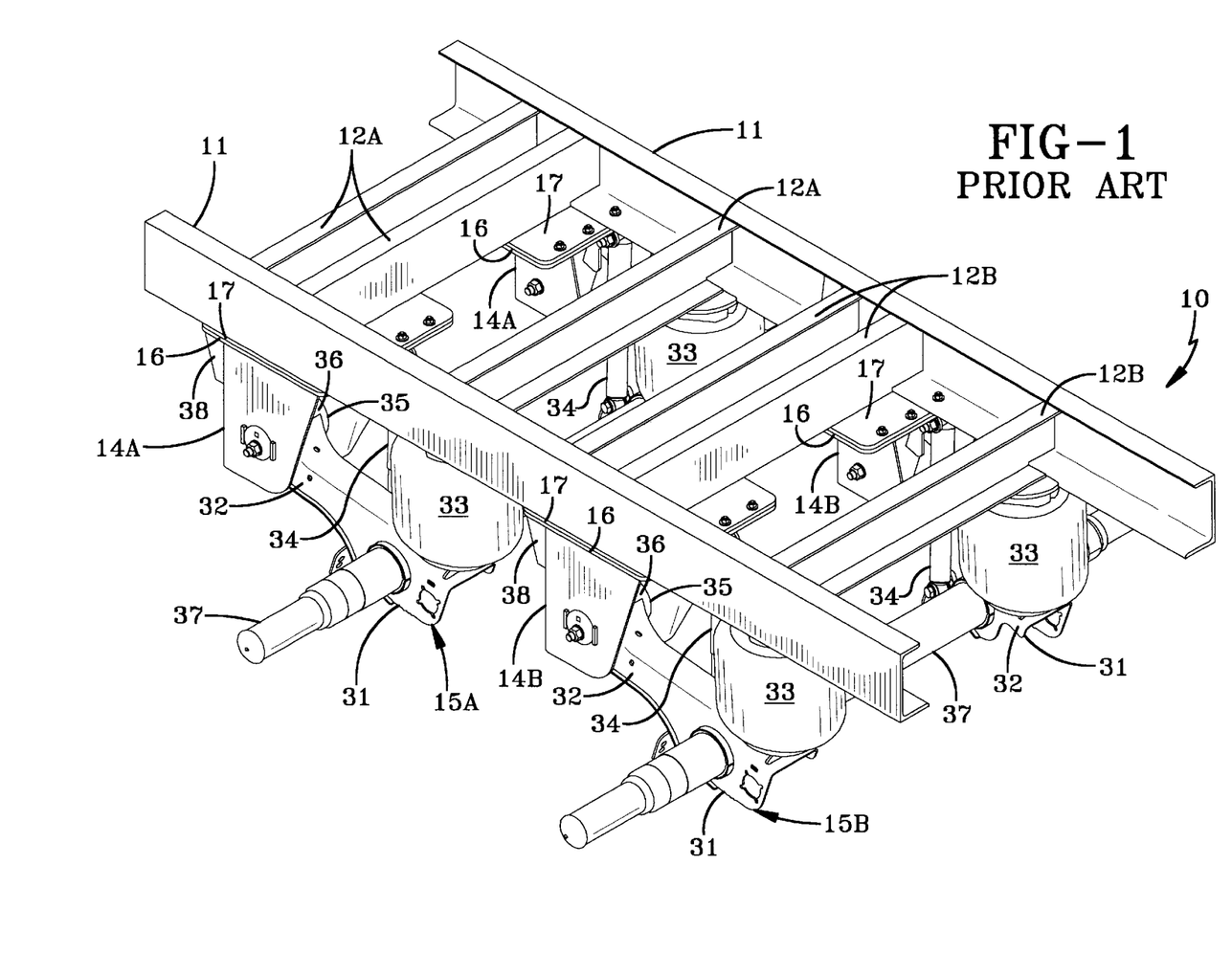
FIG. 1 is a perspective view of a portion of an aluminum frame of the type utilized on tanker trailers of semi-trailers, which includes prior art steel hangers used to suspend axle/suspension systems from the frame.

A vehicle frame is indicated generally at 10 and is shown in FIG. 1. Frame 10 represented in FIG. 1 is a portion of an aluminum tanker trailer frame of a semi-trailer. Tanker trailer frame 10 includes a pair of main members 11, a plurality of front and rear cross members 12A and 12B, respectively, and front and rear pairs of hangers 14A and 14B, respectively, for suspending axle/suspension systems 15A and 15B, respectively, from the tanker trailer frame. Trailer frame 10 utilizing prior art hangers 14A and 14B now will be described so that the general environment in which the hanger of the present invention is used can be best understood.

The components of tanker trailer frame 10 are formed of aluminum unless otherwise specified. Frame 10 is manufactured from aluminum because reduced weight is an important consideration in tanker trailer applications, and also because the type of tank (not shown) typically attached to the frame is formed of aluminum and it is easier to attach like metals to one another when constructing a vehicle. Each main member 11 of frame 10 is an elongated, generally C-shaped beam. The open portion of each main member 11 is opposed to the open portion of the other main member and faces inboard relative to frame 10. Main members 11 are connected to each other in a transversely spaced-apart parallel relationship by cross members 12A and 12B, which extend between and are perpendicular to the main members. Each end of each cross member 12A, B nests in the open portion of a respective one of main members 11, and is secured therein by any suitable means such as welding or mechanical fastening. More particularly, each cross member 12A, B also is a generally C-shaped beam, with its nested ends each being coped (FIGS. 1 and 2) so that the bottom surface of each of the cross members is in the same horizontal plane as the bottom surface of main members 11. Cross members 12A and 12B are longitudinally spaced-apart.

The structure of trailer frame 10 is completed by front and rear hangers 14A and 14B, respectively, which are each attached to and depend from respective ones of the aluminum frame main members 11 and certain ones of the plurality of cross members 12A and 12B, respectively, disposed adjacent to the hangers to aid in mounting axle/suspension systems 15A and 15B, respectively, on the frame. More specifically, hangers 14A and 14B typically are formed of steel rather than the aluminum used to form the other components of frame 10, because the hangers are subjected to severe loadings during operation of the vehicle. These loads, and especially side or lateral loads, are transferred from axle/suspension systems 15A, 15B, through hangers 14A, 14B, respectively, and into main members 11 and cross members 12A and 12B, respectively, of frame 10.

Figure 2:
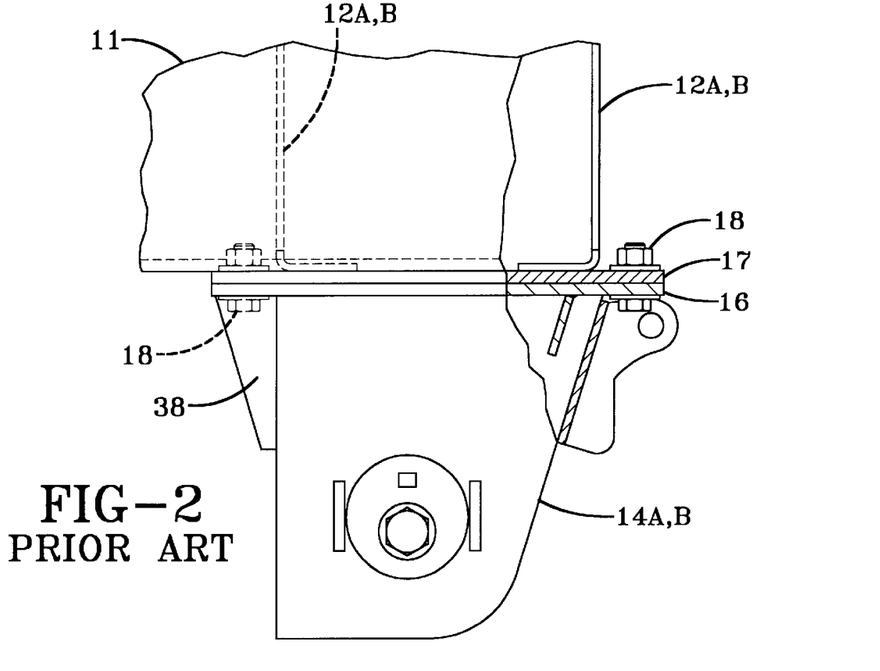
FIG. 2 is an enlarged fragmentary side view, with portions broken away and in section and hidden parts represented by dashed lines, showing the manner of attachment of the prior art steel hanger to the aluminum portion of the vehicle frame.
Figure 2A:
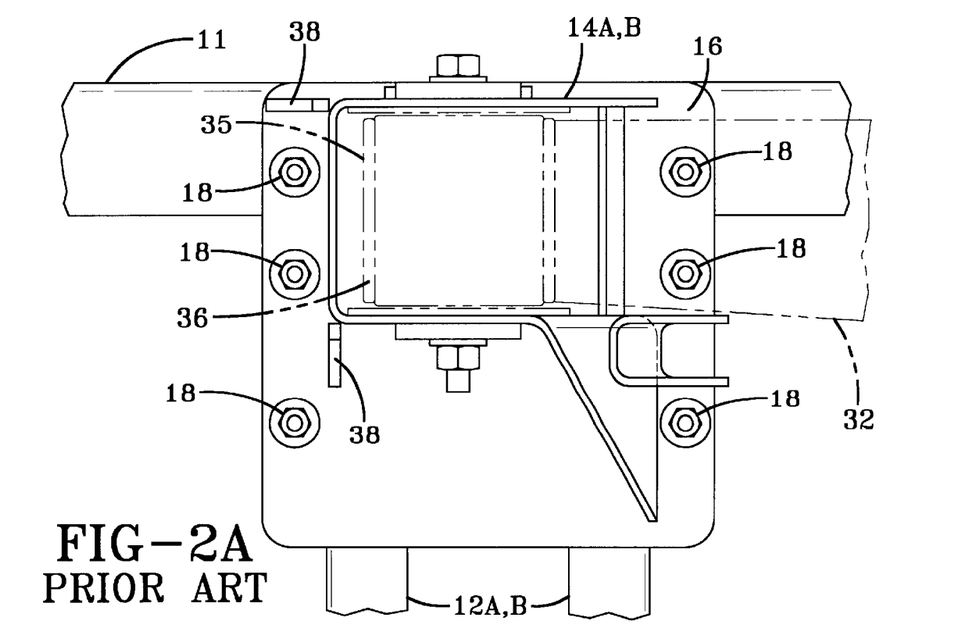
FIG. 2A is a fragmentary bottom view of the components shown in FIG. 2, and showing in dashed lines a suspension beam mounted on the hanger.

However, it is impractical to weld dissimilar materials such as steel and aluminum, and welding is the preferred method of attaching hangers to a trailer frame to keep the weight and cost of the trailer to a minimum. This problem has conventionally been solved, as best shown in FIGS. 2 and 2A, by welding a generally rectangular-shaped steel plate 16 to the top of each steel hanger 14A, B, and also welding a generally corresponding shaped and sized aluminum plate 17 to the bottom surface of a respective one of aluminum main members 11 and to respective pairs of aluminum cross members 12A, B. A plurality of aligned pairs of openings (not shown) are formed in plates 16 and 17 and a fastener 18 in turn is passed through each one of the aligned pairs of openings to effectively mount steel hangers 14A and 14B on the other structural components of aluminum frame 10.

Trailer frame 10 then is ready to support axle/suspension systems 15A and 15B. Inasmuch as each axle/suspension system 15A, B is suspended from frame 10, but does not form an integral part thereof, only the major components that comprise each system will be cited for aiding in the description of the environment in which prior art steel frame hangers 14A, B are used. Each axle/suspension system 15A, B, includes a generally identical pair of suspension assemblies 31, with each one of the pair of suspension assemblies being suspended from a respective one of the hangers of the pair of hangers 14A, B, respectively. Each suspension assembly 31 includes a suspension arm or beam 32 which is pivotally mounted at one of its ends on its respective hanger 14A, B via a bushing assembly 35, in a usual manner. Bushing assembly 35 forms a part of beam 32 and includes an outer metal tube 36 which is captured within its respective hanger 14A, B. As is well-known to those skilled in the suspension art, bushing assembly 35 includes other components which are hidden in the drawings and/or not fully described herein, including an elastomeric bushing mounted in tube 36, an inner metal tube, and a pivot bolt. An air spring 33 is suitably mounted on and extends between the upper surface of the other end of beam 32 and its respective main member 11 at a location directly beneath a respective one of cross members 12A, B. A shock absorber 34 extends between and is mounted on suspension beam 32 and its respective hanger 12A, B. Each suspension assembly 31 also includes an air brake (not shown). An axle 37 extends between and is captured in the pair of suspension beams 32 of each axle/suspension system 15A, B. Wheels (not shown) are mounted on each end of axle 37.

Unfortunately, the use of hangers 14A, B formed of steel, and additional mounting structures including heavy steel plate 16 and aluminum plate 17, which plates each are typically from about ⅜ of an inch to about ½ inch thick, and fasteners 18, all used to facilitate mounting of steel hangers 14A, B on other components of aluminum frame 10, adds unwanted weight and cost to the vehicle. In addition, the use of plates 17, 16 introduces high fatigue stresses at the welded attachment points of each of the aluminum plates to a respective one of main members 11 and its respective pair of cross members 12A, B, and at the welded attachment points of each of the steel plates to its respective prior art hanger 14A, B, respectively. More particularly, fastened plates 16 and 17 cantilever loads, particularly in tension, in relation to spaced-apart fasteners 18, and such loads pass through the plates from its respective axle/suspension system 15A, B and hanger 14A, B, respectively, as those loads are passing into main members 11 and cross members 12A, B, respectively. Such cantilevering of loads causes movement and separation of plates 16, 17, and in turn induces high fatigue stresses and possible failure on the welds that attach the plates to hangers 14A, B, and to frame members 11 and cross members 12A, B, respectively. A hanger that is welded directly to a vehicle frame, on the other hand, such as in the case where a steel hanger is welded to a frame having the remainder of its components formed from steel, is much more efficient in evenly and uniformly transferring loads from the hanger into the other components of the frame. However, as previously noted hereinabove, it is impractical to directly weld together components formed of dissimilar metals.

In addition, even though hangers 14A, B are formed of a robust steel material, due to its rigid, fabricated welded box-like design that captures outer metal tube 36 of beam bushing assembly 35, the prior art steel frame hanger is not completely efficient in transferring loads from the hanger and into the other components of aluminum vehicle frame 10. Thus, frame hangers 14A, B each must be augmented with various gussets, flanges, and the like each referred to as 38, to make the hangers more efficient in the transfer of such loads. Such additional structure also adds unwanted weight and cost to the vehicle. Moreover, similar support structures such as gussets, flanges and the like (not shown) are added to frame main members 11 and cross members 12A, B to assist in making the transfer of loads more efficient between hangers 14A, B and the main members and cross members of the frame. Also, the ends of cross members 12A, B adjacent to hangers 14A, B, as best shown in FIGS. 1 and 2, must be coped out to nest in main members 11, so that the bottom surface of the inboard non-nested central portion of the cross members traversing between the main members is at the same horizontal level as the bottommost surface of the main members. This is necessary to enable aluminum plate 17 to rest flush against the bottom surface of its respective main member and cross members 12A, B for welding the plate to those components of the frame. Such coping adds additional cost to the vehicle.

Moreover, those skilled in the trailer frame/suspension assembly art previously have made attempts to design an aluminum hanger to avoid many of the above-described problems inherent in using a steel hanger in connection with a vehicle frame which is otherwise formed of aluminum. Although such prior art aluminum hangers generally are reduced in weight over steel hangers and can be welded directly to the other components of the vehicle frame, thus eliminating add-on structure such as plates 16 and 17 and fasteners 18, such prior art aluminum hangers also have several disadvantages. First, prior art aluminum hangers generally have mimicked the design of the steel hangers shown in FIGS. 1 and 2. Since aluminum is a less robust metal than steel, prior aluminum hangers having such a design have been unable to adequately react the lateral loads imposed on the hanger, particularly by outer metal tube 36 of bushing assembly 35 during operation of the vehicle. Thus, such prior art aluminum hangers are required to be made more robust through the use of plates, gussets, flanges and the like, both on the hanger and on the other components of the frame such as main members 11 and cross members 12A, B. Such add-on structures ultimately defeat the purpose of using an aluminum hanger which could be welded directly to the other components of the frame.

Hanger 24A, B of the present invention replaces prior art steel hanger 14A, B. Since the components of axle/suspension systems 15A, B which hangers 24A, B, respectively, support are the same as shown in FIGS. 1–2 and described hereinabove, only differences between present invention hanger 24A, B and prior art hanger 14A, B, as well as changes to certain other components of frame 10 due to the use of the present invention hanger, will be described immediately below.

Figure 3:
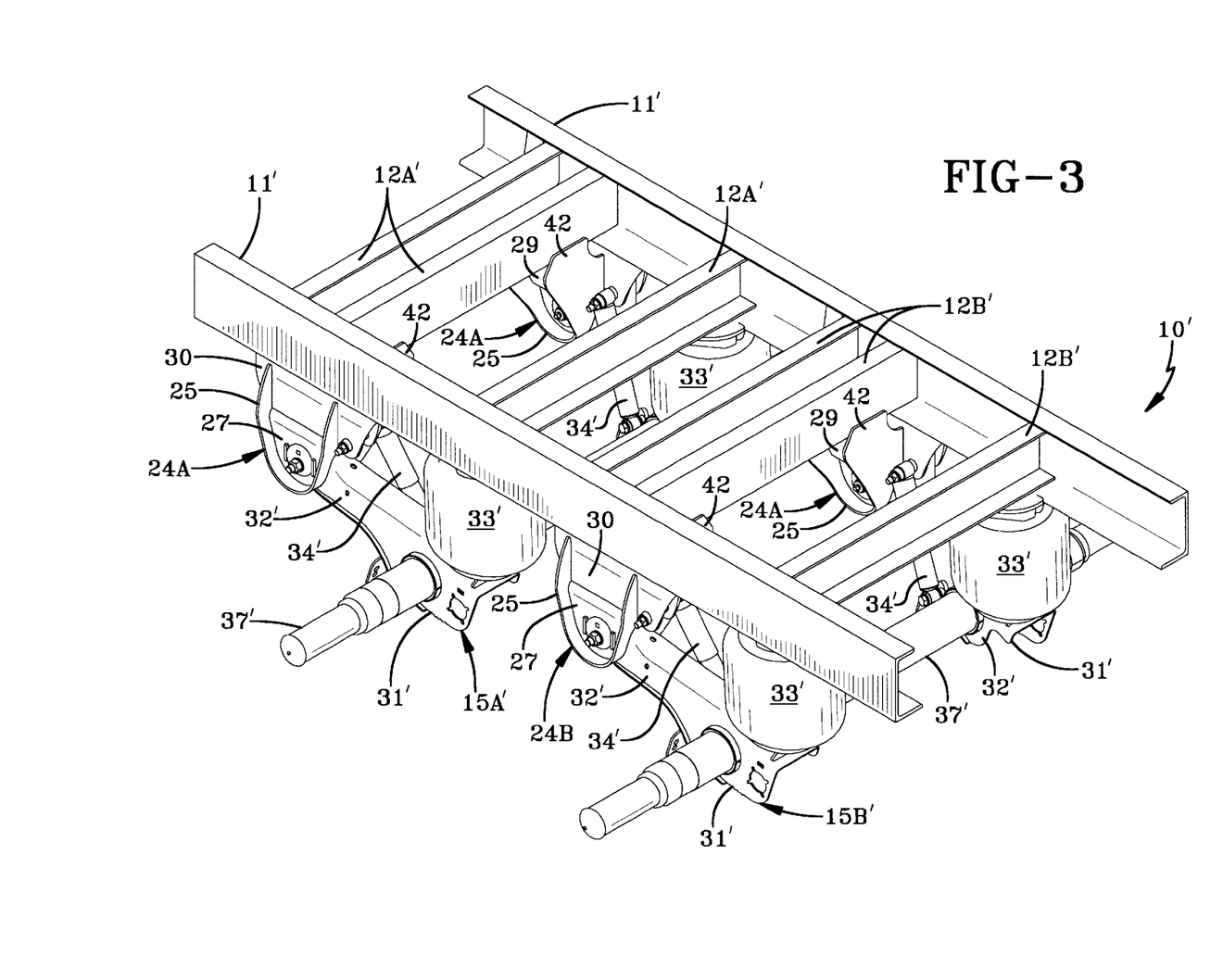
FIG. 3 is a perspective view similar to FIG. 1, but showing aluminum hangers of the present invention suspending the axle/suspension systems from the aluminum frame.
Figure 4:
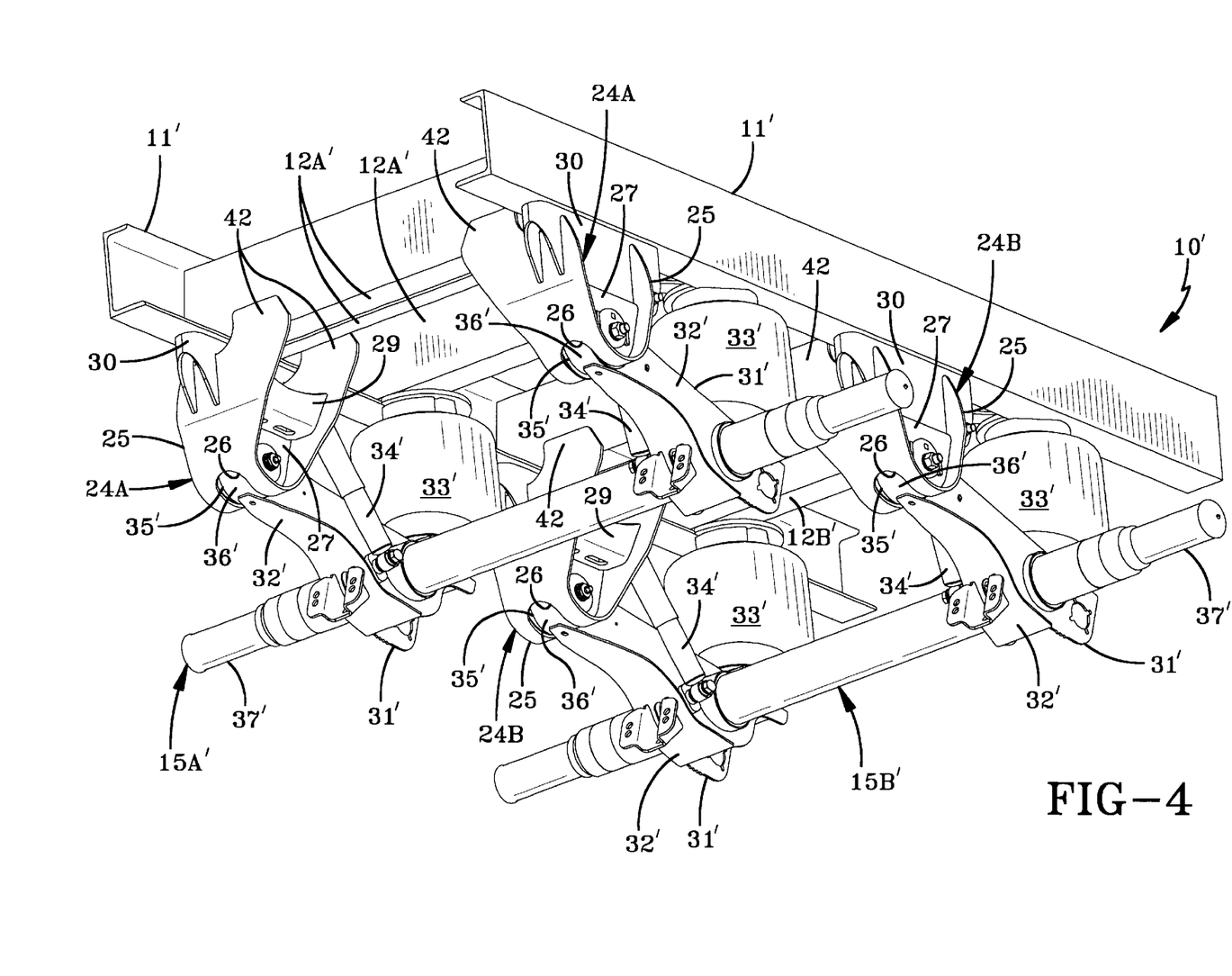
FIG. 4 is a bottom perspective view of the assembly of parts shown in FIG. 3.
Figure 5:
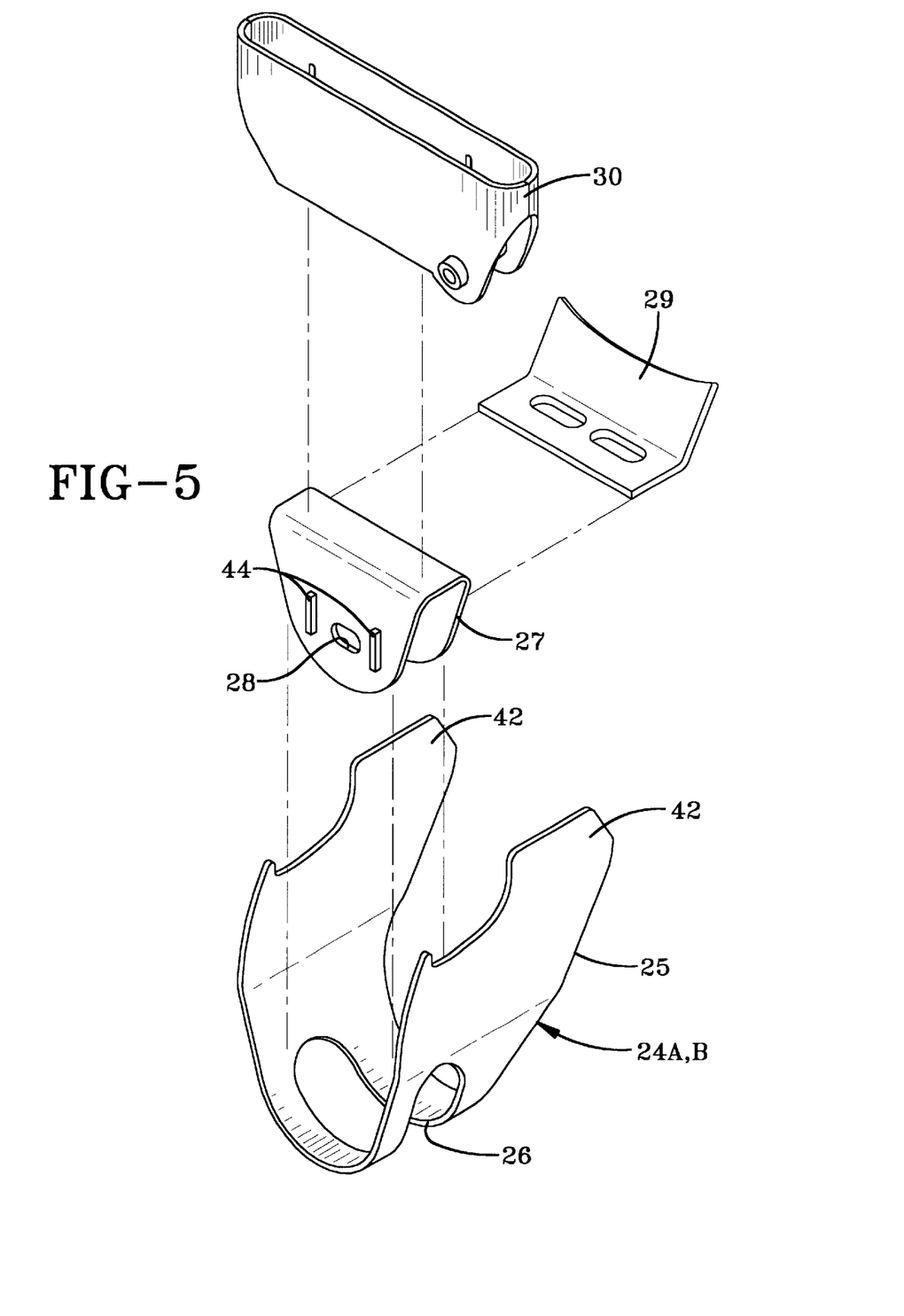
FIG. 5 is an enlarged exploded perspective view of the aluminum hanger of the present invention utilized in FIGS. 3 and 4.
Figure 6:
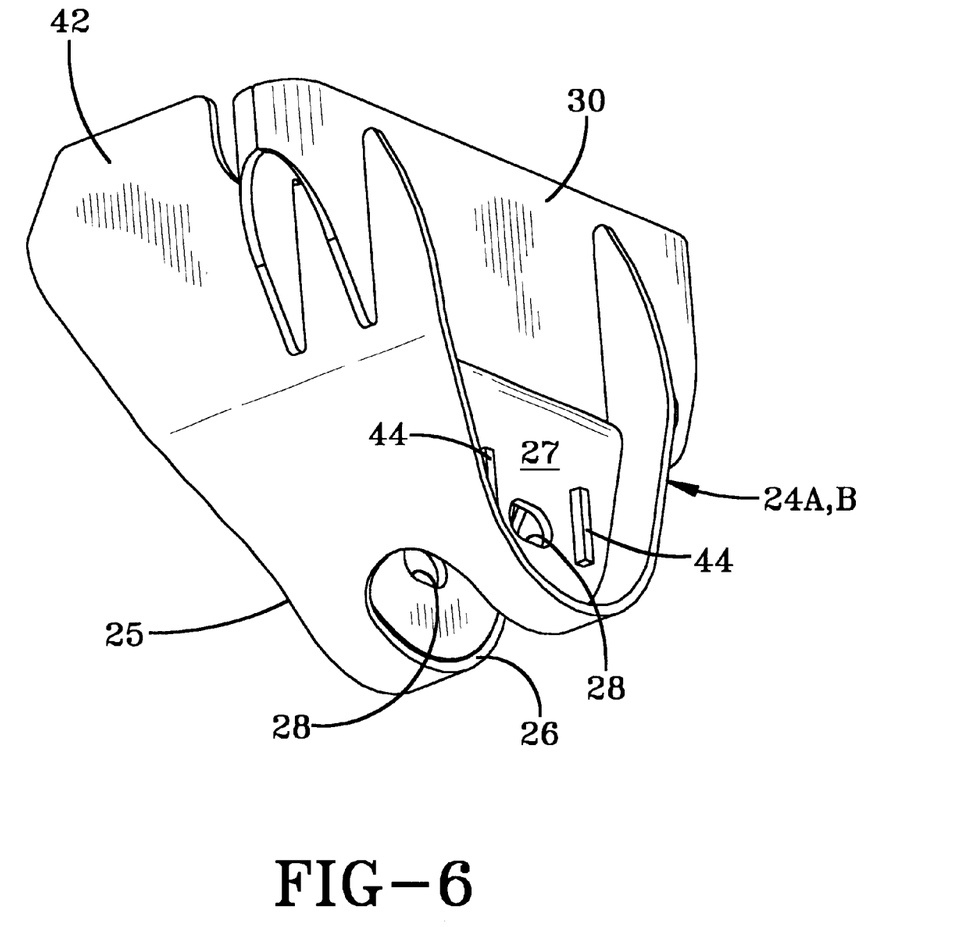
FIG. 6 is a perspective view of the hanger of FIG. 5 shown in an assembled state.
Figure 7:
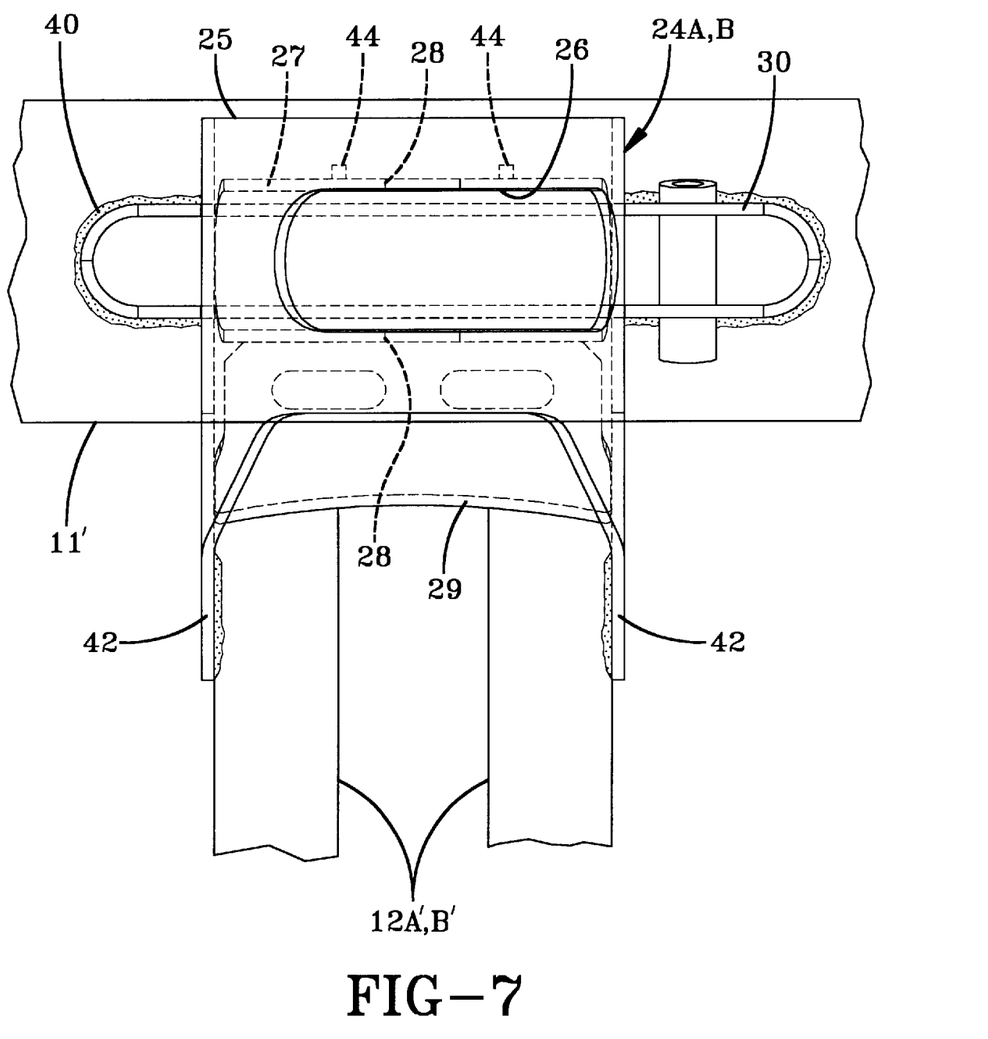
FIG. 7 is an enlarged fragmentary bottom view, with hidden parts represented by dashed lines, showing the manner of welded attachment of the hanger of FIG. 6 to the other components of the vehicle frame as represented in FIGS. 3 and 4.

Hanger 24A, B is shown in FIGS. 3–7, with FIGS. 3, 4 and 7 showing the hanger as a component of frame 10'. Since frame 10' differs from frame 10 of FIG. 1 only in that frame 10' uses present invention hanger 24A, B rather than prior art hanger 14A, B, and certain reinforcing gussets, flanges, and the like are removed from the frame due to the use of the present invention hanger, all of the similar components of the frame and axle/suspension systems 15A', B' shown in FIGS. 3, 4 and 7 are identified by a prime ' but use the same identifying number as the parts shown in FIGS. 1 and 2.

Each hanger 24A, B is formed of aluminum and includes a generally U-shaped base 25 formed with an opening 26 for receiving suspension beam 32'. U-shaped base 25 further includes a pair of inboardly upwardly extending wings 42, which are especially important for aiding in the transfer of lateral or side loads from hanger 24A, B and into other components of frame 10', as will be described in greater detail below. A generally inverted U-shaped support member 27 nests in U-shaped base 25 adjacent to and straddling opening 26 and is attached to the base preferably by welds (not shown), and especially aids in reacting vertical loads, as well as side loads. The vertical portions of support member 27 are formed with transversely aligned openings 28 for receiving the pivot bolt which passes through and pivotally attaches beam bushing assembly 35' to hanger 24A, B. A pair of vertically disposed, horizontally spaced alignment guides 44 each are located on the outboard vertical sidewall of support member 27 to aid in the alignment of axle/suspension system 15A', B', as is well-known to the art and literature. A bent plate 29 extends between and is welded to the inboard vertical sidewall of support member 27 and to wings 42 of U-shaped base 25 to provide additional support to the structure primarily for reacting side loads. A generally oval-shaped connection member 30 nests in U-shaped base 25 and rests on the upper horizontal surface of support member 27, and is welded to the U-shaped base and the support member to complete the structure of aluminum hanger 24A, B.

Hanger 24A, B is attached to the other components of frame 10' by a continuous weld 40 disposed at the interface of the uppermost edge of connection member 30 and the bottom surface of its respective main member 11' (FIG. 7). Each wing 42 of U-shaped base 25 is welded to a respective one of cross members 12A', B' (FIGS. 4 and 7) to complete the attachment of hangers 24A, B and the structure of trailer frame 10' incorporating the hangers of the present invention.

It is understood that a number of important features of present invention hanger 24A, B enable its formation from a lightweight metal such as aluminum, rather than a heavier metal such as steel. Beam opening 26 and U-shaped base 25, as well as support member 27, enable hanger 24A, B to generally completely and continuously surround the pivotal attachment area of beam 32' to the hanger, thus providing enhanced structural support, which is a design feature quite different than the design of conventional prior art fabricated steel hangers 14A, B which have several components welded together into a more open box-like yoke structure (FIG. 2A). U-shaped base 25 welds not only to its respective main member 11' via connection member 30, but to a respective pair of cross members 12A', B' via wings 42. This latter structural feature, together with bent plate 29, aids in providing superior lateral load distribution to hanger 24A, B by channeling the side loads encountered by the hanger into cross members 12A', B' and into the other structural components of frame 10', such as main members 11'. This design feature, coupled with the other design features of hanger 24A, B which substantially completely and continuously surround outer metal tube 36' of bushing assembly 35', results in excellent lateral support structure. This lateral support enables hanger 24A, B to especially successfully react side loads, despite the fact that the hanger is formed of aluminum, without the use of associated gussets, flanges, and the like. The integral one-piece structure of U-shaped base 25 also allows for elimination of a heavy C-channel frame cross brace between each of the front and rear pairs of hangers 24A and 24B, respectively, which braces were commonly utilized in prior art hangers 14A, B (not shown in FIG. 1). Moreover, certain other add-on structural components used in frame 10 to assist prior art hanger 14A, B in reacting loads, such as gussets, flanges, and the like, are not required in frame 10' due to the structure of hanger 24A, B. The design of hanger 24A, B also allows for simpler weld attachment to the other frame components than is found in prior art aluminum hangers due to the use of continuous weld 40. In particular, weld interruptions are minimized which results in fewer areas of weld stress fatigue and possible weld failure. The structure of hanger 24A, B also eliminates the need of costly coping of each end of cross members 12A', B' to which hanger 24A, B is attached, such as shown in FIG. 2 for prior art hanger 14A, B.

Thus, it can be seen that hanger 24A, B of the present invention, because of its formation from aluminum, is lightweight, and eliminates complicated attachment assemblies which heretofore have been needed to successfully attach steel hangers to aluminum frames. In addition, the simplified yet efficient structure enables hanger 24A, B to successfully react loads passing through the hanger from its associated axle/suspension system 15A', B' and into the other components of frame 10', without the use of additional gussets, flanges or the like on hanger 24A, B or frame 10'.

Although those skilled in the trailer frame/suspension assembly art previously have made attempts to design an aluminum hanger to replace steel hangers for aluminum frame applications, applicants believe that aluminum hanger 24A, B of the present invention incorporates a novel structural design which enables the hanger to react various loads passing through the hanger during operation of the vehicle, and especially lateral or side loads. Previous attempts to solve this problem in an aluminum structure using conventional hanger design required utilization of extremely thick side plates, reinforcement bosses, gussets and the like, both on the hanger and vehicle frame, which defeated the purpose of a lightweight aluminum hanger, despite the fact that such hangers could be welded directly to the other components of the vehicle frame. The present invention in particular reacts lateral loads with success due especially to support member 27, bent plate 29, and wings 42 of U-shaped base 25 which attach to cross members 12A', B' and direct the side loadings into the cross members and other components of the frame such as main members 11'.

It is understood that hanger 24A, B of the present invention can be used in connection with tapered beams utilizing reduced-size bushings or, alternatively, can be designed for use with conventional-sized beams utilizing conventional-size bushings by widening the hanger. Although preferred for use on aluminum tanker trailer frames, it is contemplated that hanger 24A, B of the present invention also could be utilized on other types of aluminum semi-trailer frames or even on aluminum movable subframes for semi-trailers. Hanger 24A, B also could be utilized on aluminum vehicle frames other than semitrailer frames.

Accordingly, the improved aluminum frame hanger for axle/suspension systems is simplified, provides an effective, safe, inexpensive, and efficient structure which achieves all the enumerated objectives, provides for eliminating difficulties encountered with prior steel and aluminum hanger structures, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved hanger is constructed, arranged and used, the characteristics of the construction and arrangement, and the advantageous, new and useful results obtained; the new and useful structures, devices, elements, arrangements, parts and combinations are set forth in the appended claims.

What is claimed is:

1. An aluminum vehicle frame including a frame hanger for suspending a suspension assembly of an axle/suspension system from said vehicle frame, said frame including a pair of transversely spaced longitudinally extending main members and a plurality of cross members extending between and interconnecting said main members, said axle/suspension system including a pair of transversely spaced suspension assemblies, each one of said pair of suspension assemblies including a longitudinally extending beam, said beams of said pair of suspension assemblies capturing a transversely extending axle having at least one wheel mounted on each end of said axle, said beams each including at one of its ends a bushing assembly for pivotally mounting the beam on said frame hanger, wherein the improvement comprises:

an integral frame hanger including a generally U-shaped lower portion which substantially surrounds and laterally supports said bushing assembly, so that said hanger reacts lateral loads and other loads transferred from said axle/suspension system into said frame during operation of said vehicle, without requiring additional support structure on said hanger and on said main members and said cross members of said frame.

2. The frame hanger of claim 1, said hanger being formed of aluminum.

3. The frame hanger of claim 2, said hanger being directly attached to said frame main member by a continuous weld.

4. The frame hanger of claim 3, said generally U-shaped lower portion being a generally U-shaped base member formed with an opening for receiving said beam bushing assembly; an inverted generally U-shaped support member nesting in and being attached to said base member; said base member and said support member substantially surrounding said beam bushing assembly; said base member being formed with a pair of generally inboardly and upwardly extending wings; a bent plate extending between and being attached to an inboard wall of said support member and said wings; and a connection member nesting in and being attached to said base member and said support member.

5. The frame hanger of claim 4, said connection member being attached to said main member by a continuous weld and each of said wings being directly welded to a respective one of said cross members.

6. An aluminum vehicle frame including a frame hanger for suspending a suspension assembly of an axle/suspension system from said vehicle frame, said frame including a pair of transversely spaced longitudinally extending main members and a plurality of cross members extending between and interconnecting said main members, said axle/suspension system including a pair of transversely spaced suspension assemblies, each one of said pair of suspension assemblies including a longitudinally extending beam, said beams of said pair of suspension assemblies capturing a transversely extending axle having at least one wheel mounted on each end of said axle, said beams each including at one of its ends a bushing assembly for pivotally mounting the beam on said frame hanger, wherein the improvement comprises:

an integral frame hanger formed of aluminum, said frame hanger including a generally U-shaped base member formed with an opening for receiving said beam bushing assembly and an inverted generally U-shaped support member nested in and attached to said base member, said base member and said support member substantially surrounding said beam bushing assembly, said base member further being formed with a pair of generally inboardly and upwardly extending wings, said hanger further including a bent plate extending between and being attached to an inboard wall of said support member and said wings, and a connection member nesting in and being attached to said base member and said support member, said hanger being directly attached to said frame main member by a continuous weld.

7. An aluminum vehicle frame including a frame hanger for suspending a suspension assembly of an axle/suspension system from said vehicle frame, said frame including a pair of transversely spaced longitudinally extending main members and a plurality of cross members extending between and interconnecting said main members, said axle/suspension system including a pair of transversely spaced suspension assemblies, each one of said pair of suspension assemblies including a longitudinally extending beam, said beams of said pair of suspension assemblies capturing a transversely extending axle having at least one wheel mounted on each end of said axle, said beams each including at one of its frame during operation of said vehicle, without requiring additional support structure on said hanger and on said main members and said cross members of said frame.

8. An aluminum vehicle frame including a frame hanger for suspending a suspension assembly of an axle/suspension system from said vehicle frame, said frame including a pair of transversely spaced longitudinally extending main members and a plurality of cross members extending between and interconnecting said main members, said axle/suspension system including a pair of transversely spaced suspension assemblies, each one of said pair of suspension assemblies including a longitudinally extending beam, said beams of said pair of suspension assemblies capturing a transversely extending axle having at least one wheel mounted on each end of said axle, said beams each including at one of its ends a bushing assembly for pivotally mounting the beam on said frame hanger, wherein the improvement comprises:

an integral frame hanger formed of aluminum, said frame hanger including a generally U-shaped base member formed with an opening for receiving said beam bushing assembly and an inverted generally U-shaped support member nested in and attached to said base member, said base member and said support member generally completely surrounding said beam bushing assembly, said base member further being formed with a pair of generally inboardly and upwardly extending wings, said hanger further including a bent plate extending between and being attached to an inboard wall of said support member and said wings, and a connection member nesting in and being attached to said base member and said support member, said hanger being directly attached to said frame main member by a continuous weld.

9. An aluminum vehicle frame including a frame hanger for suspending a suspension assembly of an axle/suspension system from said vehicle frame, said frame including a pair of transversely spaced longitudinally extending main members and a plurality of cross members extending between and interconnecting said main members, said axle/suspension system including a pair of transversely spaced suspension assemblies, each one of said pair of suspension assemblies including a longitudinally extending beam, said beams of said pair of suspension assemblies capturing a transversely extending axle having at least one wheel mounted on each end of said axle, said beams each including at one of its ends a bushing assembly for pivotally mounting the beam on said frame hanger, wherein the improvement comprises:

an integral frame hanger formed of aluminum, said frame hanger including a generally U-shaped base member formed with an opening for receiving said beam bushing assembly and an inverted generally U-shaped support member nested in and attached to said base member, said base member and said support member generally completely surrounding said beam bushing assembly, said base member further being formed with a pair of generally inboardly and upwardly extending wings, said hanger further including a bent plate extending between and being attached to an inboard wall of said support member and said wings, and a connection member nesting in and being attached to said base member and said support member, said hanger being directly attached to said main member by a continuous weld between said connection member and said main member and by welds between said wings and said cross members.

10. An aluminum vehicle frame including a frame hanger for suspending a suspension assembly of an axle/suspension system from said vehicle frame, said frame including a pair of transversely spaced longitudinally extending main members and a plurality of cross members extending between and interconnecting said main members, said axle/suspension system including a pair of transversely spaced suspension assemblies, each one of said pair of suspension assemblies including a longitudinally extending beam, said beams of said pair of suspension assemblies capturing a transversely extending axle having at least one wheel mounted on each end of said axle, said beams each including at one of its ends a bushing assembly for pivotally mounting the beam on said frame hanger, wherein the improvement comprises:

an integral frame hanger which substantially surrounds and laterally supports the bushing assembly, said frame hanger including a lower portion which extends continuously from a location adjacent to a front portion of said bushing assembly, beneath a bottom portion of the bushing assembly, and to a location adjacent to a rear portion of said bushing assembly, the frame hanger lower portion substantially surrounding and laterally supporting said front, bottom and rear portions of the bushing assembly, so that said hanger reacts lateral loads and other loads transferred from said axle/suspension system into said frame during operation of said vehicle, without requiring additional support structure on said hanger and on said main members and said cross members of said frame.

* * * * *

UNITED STATES PATENT AND TRADEMARK OFFICE
CERTIFICATE OF CORRECTION

PATENT NO. : 6,425,593 B2  Page 1 of 1
APPLICATION NO. : 09/814205
DATED : July 30, 2002
INVENTOR(S) : Eric W. Fabris et al.

It is certified that error appears in the above-identified patent and that said Letters Patent is hereby corrected as shown below:

column 9, Claim 7, line 39, cancel the text beginning with "frame during operation of" to and ending "said frame." in column 9, Claim 7, line 41, and insert the following:

--ends a bushing assembly for pivotally mounting the beam on said frame hanger, wherein the improvement comprises:
 an integral frame hanger formed of aluminum, said frame hanger including a generally U-shaped base member formed with an opening for receiving said beam bushing assembly and an inverted generally U-shaped support member nested in and attached to said base member, said base member and said support member substantially surrounding said beam bushing assembly, said base member further being formed with a pair of generally inboardly and upwardly extending wings, said hanger further including a bent plate extending between and being attached to an inboard wall of said support member and said wings, and a connection member nesting in and being attached to said base member and said support member, said hanger being directly attached to said main member by a continuous weld between said connection member and said main member and by welds between said wings and said cross members.--

Signed and Sealed this

Fifth Day of December, 2006

JON W. DUDAS
*Director of the United States Patent and Trademark Office*